(12) United States Patent
Lampe et al.

(10) Patent No.: US 7,743,640 B2
(45) Date of Patent: Jun. 29, 2010

(54) FOOTBALL HELMET, TESTING METHOD, AND TESTING APPARATUS

(76) Inventors: John Karl Lampe, 262 Griggs St. South, St. Paul, MN (US) 55105; Douglas R. Oudekerk, 2003 Goodrich Ave., St. Paul, MN (US) 55105

( * ) Notice: Subject to any disclaimer, the term of this patent is extended or adjusted under 35 U.S.C. 154(b) by 172 days.

(21) Appl. No.: 12/106,319

(22) Filed: Apr. 20, 2008

(65) Prior Publication Data

US 2008/0256685 A1    Oct. 23, 2008

Related U.S. Application Data

(60) Provisional application No. 60/925,192, filed on Apr. 19, 2007.

(51) Int. Cl.
*G01M 7/00*    (2006.01)
(52) U.S. Cl. .................................... 73/12.04
(58) Field of Classification Search ...... 73/12.01–12.14
See application file for complete search history.

(56) References Cited

U.S. PATENT DOCUMENTS

| | | | |
|---|---|---|---|
| 4,937,888 A | 7/1990 | Straus | |
| 5,713,082 A | 2/1998 | Bassette et al. | |
| 5,724,681 A | 3/1998 | Sykes | |
| 6,219,850 B1 | 4/2001 | Halstead et al. | |
| 6,256,799 B1 | 7/2001 | McGlasson et al. | |
| 6,314,586 B1 | 11/2001 | Duguid | |
| 6,446,270 B1 | 9/2002 | Durr | |
| 6,539,175 B1 * | 3/2003 | Geary et al. ................... | 396/59 |
| 6,591,428 B2 | 7/2003 | Halstead et al. | |
| 6,871,525 B2 * | 3/2005 | Withnall et al. ............. | 73/12.14 |
| 6,928,385 B2 * | 8/2005 | Ebisawa ....................... | 702/155 |
| 6,934,971 B2 * | 8/2005 | Ide et al. ......................... | 2/425 |
| 6,986,168 B2 | 1/2006 | Abelman et al. | |
| 7,062,795 B2 | 6/2006 | Skiba et al. | |
| 7,076,811 B2 | 7/2006 | Puchalski | |
| 7,089,602 B2 | 8/2006 | Talluri | |
| 7,509,835 B2 * | 3/2009 | Beck .......................... | 73/12.01 |
| 7,526,389 B2 * | 4/2009 | Greenwald et al. ............ | 702/55 |
| 2004/0025231 A1 | 2/2004 | Ide et al. | |
| 2004/0074283 A1 | 4/2004 | Withnall et al. | |
| 2005/0278835 A1 | 12/2005 | Ide et al. | |
| 2006/0137073 A1 | 6/2006 | Crisco | |

* cited by examiner

*Primary Examiner*—Max Noori (57) ABSTRACT

In one embodiment, a method for testing a helmet comprising the steps of: placing a strike helmet on a first headform; placing a target helmet on a second headform, colliding the strike helmet against the target helmet; and measuring the acceleration of the second headform caused by the collision. In a second embodiment, an apparatus for testing a helmet comprising: a strike helmet placed on a first headform; a target helmet placed on a second headform; a motion device for moving the strike helmet to collide with the target helmet.

17 Claims, 7 Drawing Sheets

FOOTBALL HELMET, TESTING METHOD, AND TESTING APPARATUS

This application claims the benefit of U.S. Provisional Application Nos. 60/925,192 filed on Apr. 19, 2007.

FIELD OF INVENTION

The present invention generally relates to a protective device for the head. Specifically, the device can be, for example, a helmet used in American football.

BACKGROUND

Many sports require protective headgear. American football, hockey, lacrosse, and baseball are sports that require headgear for at least certain activities that occur during a game.

American football has long required that a player wear a helmet. Most helmets today have a hard shell, a liner, a facemask, and a chinstrap for retaining the helmet on the head of the wearer.

For American football, various entities have promulgated standards to regulate the effectiveness helmets in protecting players. The National Operating Committee on Standards for Athletic Equipment (NOCSAE), for example, has issued the "Standard Performance Specification for Newly Manufactured Football Helmets, NOCSAE DOC (ND)002-98m05 (Modified July, 2005). Another standard is one issued by the American Society for Testing and Measurement (ASTM), ASTM F717-89(2006) Standard Specification for Football Helmets. These standards measure linear acceleration of a head form resulting from an impact.

Alternative and supplemental standards have been proposed. U.S. Pat. No. 6,871,525 proposes a method and apparatus for testing football helmets. The proposed method includes measurements of linear and rotation head acceleration due to impacts.

Despite the use of improved helmets and despite the existence of standards, however, significant numbers of football players still suffer concussions. It is estimated that over 100,000 football players suffer concussions each year.

One problem with football helmets is that they do not just serve as a means for protection for the wearer. They also serve as a striking instrument in high impact collisions between players. The National Football League, for example, has conducted studies of helmet-to-helmet collisions that caused a concussion. These studies indicate that a "concussion in professional football involves a mean impact velocity of 9.3 m/second (20.8 mph) and a head velocity change of 7.2 m/second (16.1 mph)." Pellman E J, Viano D C, Concussion in Professional Football: Summary of the Research Conducted by the National Football League's Committee on Mild Traumatic Brain Injury, Neurosurgery Focus. 2006; Vol. 21. Helmet-to-helmet impacts at such velocities can easily result in concussion.

Existing standards make no requirement that a striking player's helmet reduce the peak forces transmitted through the striking player's helmet during a collision. Instead, standards only focus on the helmet worn by the player being struck. Unfortunately, in an effort to make helmets better able to withstand impacts, the rigidity of the shell of the helmet is often increased. While a more rigid helmet may marginally better protection to the wearer, it also creates a helmet that is a more devastating instrument in causing concussions in helmet-to-helmet collisions.

The prior art suffers from certain shortcomings or limitations. The purpose of the present invention is to overcome the shortcomings or limitations in the prior art.

SUMMARY OF THE INVENTION

The invention comprises a helmet having a plurality of zones of different levels of rigidity. For example, the helmet can have a zone of lower rigidity near that portion of the helmet that covers the frontal bone.

The invention also comprises a testing apparatus and method. The testing apparatus and method can be used to test a striking helmet. The testing apparatus and method can replicate a helmet-to-helmet collision of a kind that often causes concussions, especially for the impacted player. The objective of the testing method can be to determine the level of impact or peak level of energy delivered by a striking helmet in an impact test. A more protective striking helmet can be one that delivers a lower level of impact or a lower level of peak energy to an impacted head form.

The above summary of the of the present invention is not intended to describe each illustrated embodiment, object, advantage, or use of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

DETAILED DESCRIPTION OF THE INVENTION INCLUDING A BEST MODE

Nomenclature 100 helmet
101 helmet shell
102 helmet liner
103 additional liner
104 transition area
105 human skull
106 frontal bone
107 top of skull
108 parietal bone
109 occipital bone
115 head of wearer
200 helmet
300a striking helmet
300b impacted helmet (or target helmet)
310 testing apparatus 311a striking head form (or first headform)
311b impacted head form (or second headform)
312 head assembly
313 neck assembly
314a first impact location
314b second impact location
314c third impact location
314d fourth impact location First Embodiment FIGS. 1A to 1D show a helmet 100 according to a first embodiment. The helmet 100 can be of a kind that can be used in contact sports such as American football.

The helmet 100 can have a shell 101 which is the outer covering of the football helmet 100. The helmet 100 can have a liner 102 which is the padding inside the shell 101. The helmet 100 can have other accessories added to it such as a facemask (not shown) and a chinstrap (not shown).

Figure 1A:
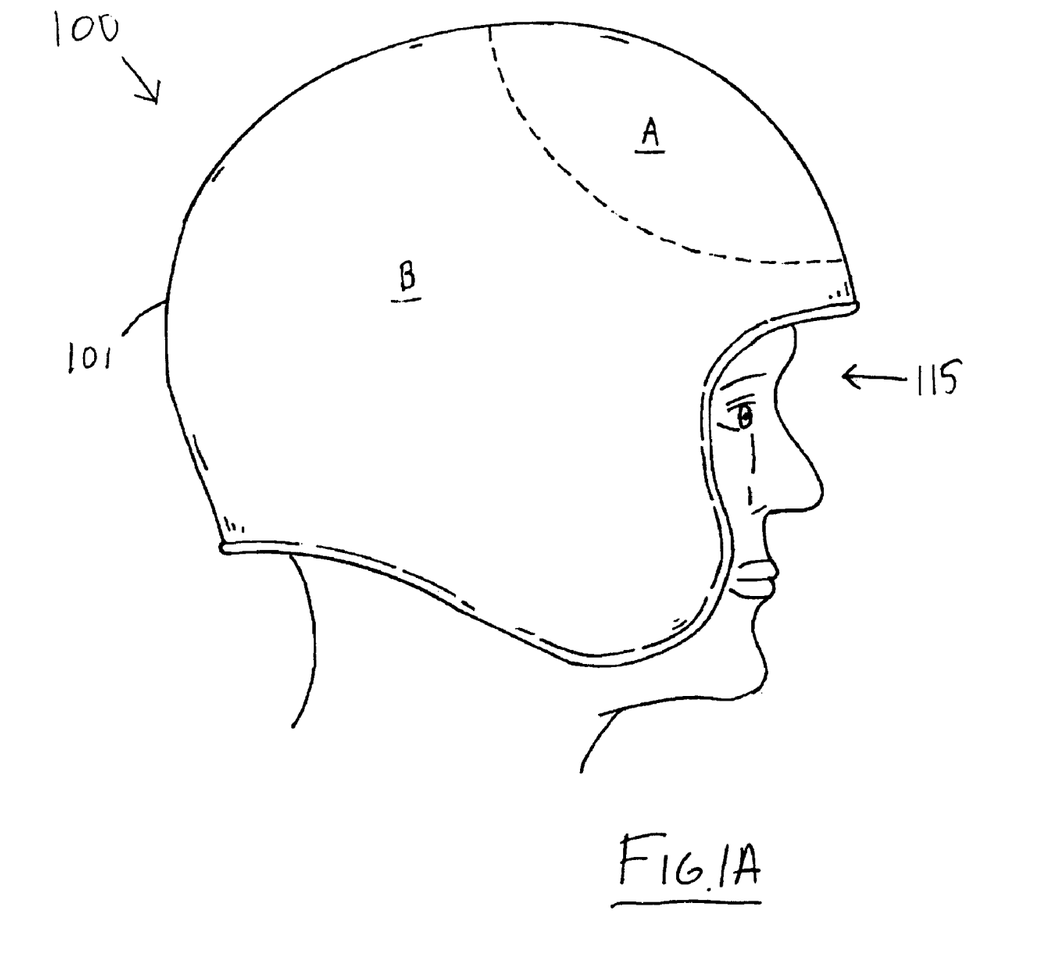
FIG. 1A shows a side elevation view of a head with a helmet according to a first embodiment.
Figure 1B:
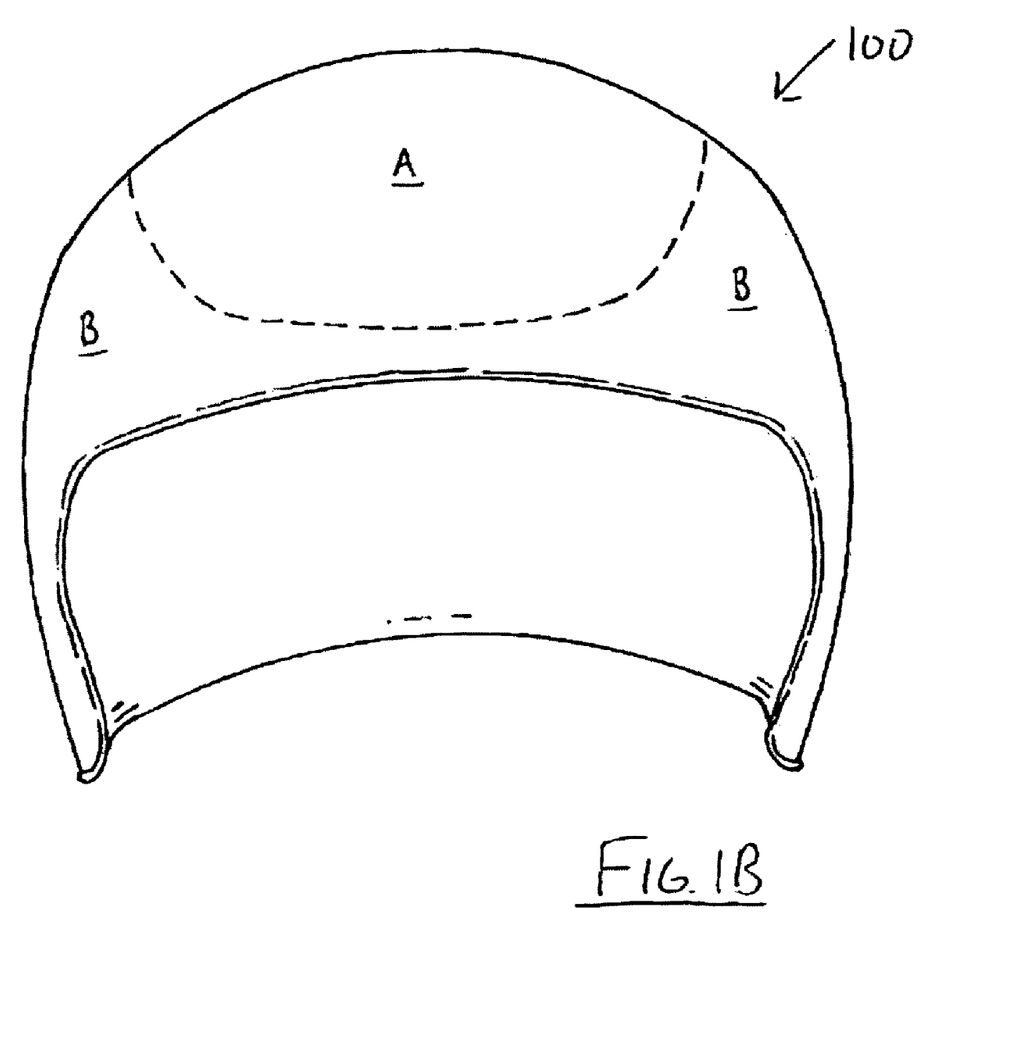
FIG. 1B shows a front elevation view of a helmet according to a first embodiment.
Figure 1C:
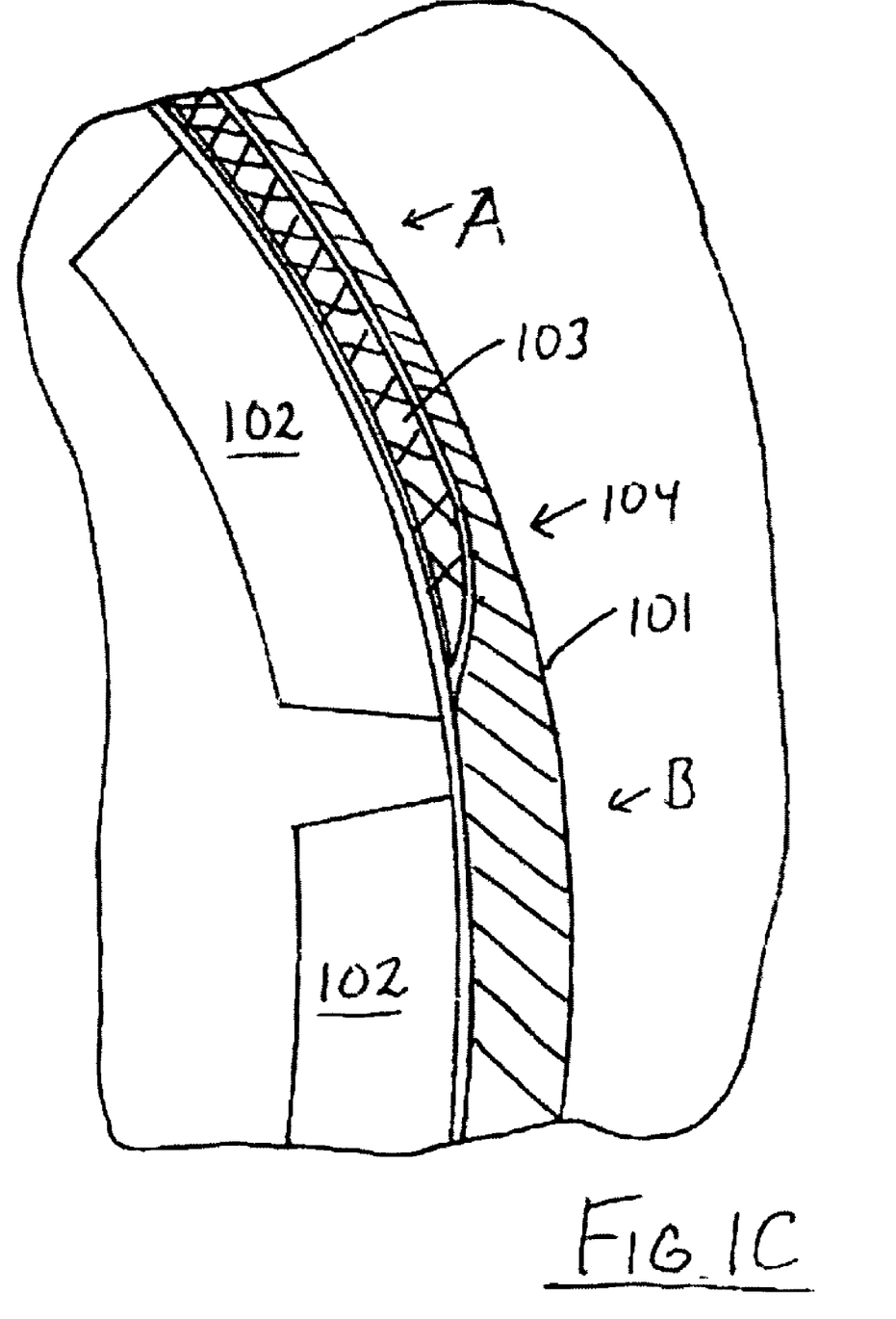
FIG. 1C shows a cross section of a helmet according to a first embodiment.
Figure 1D:
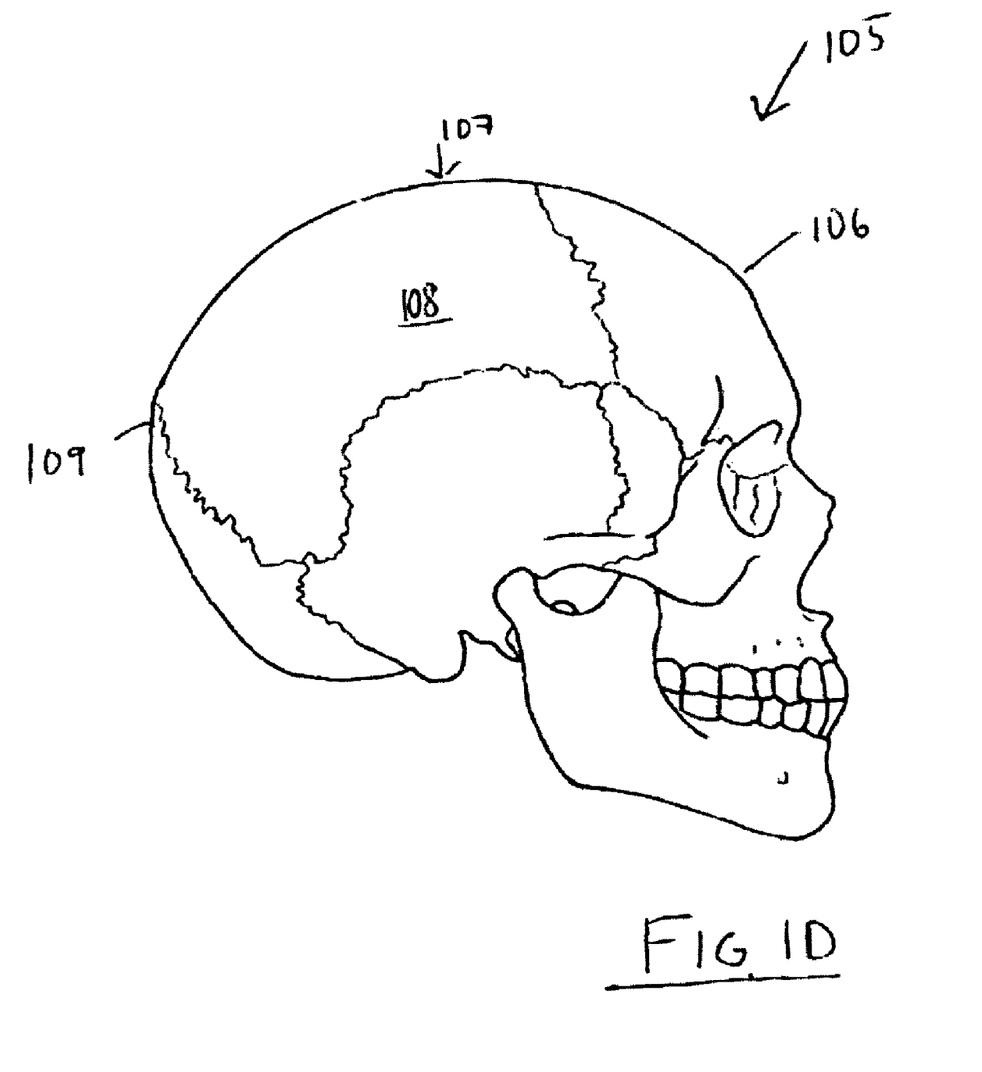
FIG. 1D shows a side elevation view of a human skull.

The shape of the shell 101 of the helmet 100 can be that of a conventionally shaped football helmet 100 as shown in FIGS. 1A and 1B. The shell 101 can have two or more zones. As shown in FIGS. 1A to 1C, the helmet 100 can have two zones, zone A and zone B. Each zone can be developed with a different level of rigidity. For example, zone A can have a lower modulus of elasticity than zone B.

FIG. 1C shows a cross-sectional view of the shell 101 and liner 102 of the helmet 100. FIG. 1C can show the transition 104 from zone B to zone A. Zone B can be thicker than zone A. This transition 104 can be accomplished most readily in the process of molding the helmet shell 101. Zone A, for example, can be approximately 0.125 in. thick. Zone B can be approximately 0.250 in. thick. Depending on materials used and the demands of the application, many other thicknesses may also be appropriate.

The material that can be used for the shell 101 can be similar to those used for prior art helmets. For example, the material can be a polycarbonate plastic. Other materials including plastics such as thermosets, elastomers, or thermoplastics other than polycarbonate can also be used. Materials such as composites (including for example, carbon fiber or fiber glass), metals, ceramics, or other materials can also be incorporated into the exterior sections or other parts of the helmet 100.

In the zone A area inside the shell 101, an additional, intermediate layer of liner 103 can be used. For the intermediate layer 103, various dense elastomers such as vinyl nitrile may be suitable. Such materials can provide shock attenuation but also can be flexible enough to expand and contract with movement of the shell 101 at zone A. Many other materials can also be suitable.

The location of zone A as shown in FIGS. 1A and 1B can be beneficial to player safety. Researchers have studied how players in the National Football League sustain concussions during play. One study described the typical way in which a concussion occurred. The striking player strikes the other player helmet-to-helmet. The recipient of the blow was generally unprepared to receive the blow. The striking player lined up his head, neck, and torso before impact and struck the other player at an average speed of 21 mph. Pellman E J, Viano D C, Tucker A M, Casson I R, Waeckerle J F. Concussion in Professional Football: Reconstruction of Game Impacts and Injuries. Neurosurgery, 2003; 53 (4):799-812. In most instances, this method of hitting an opposing player is considered "spearing" and should be penalized.

Research sponsored by the NFL isolated the primary impact area of a helmet that typically were used by the striking player to deliver concussive blows. Pellman E J, Viano D C, Concussion in Professional Football: Summary of the Research Conducted by the National Football League's Committee on Mild Traumatic Brain Injury, Neurosurgery Focus. 2006; 21: 263-274. The primary impact area on the helmet of the striking player generally was located near the frontal bone 106 of the striking player. In the data collected by Pellman et al. (2006), the primary impact area on the helmet of the striking player generally are near the frontal bone 106 on the human skull 105 and would be within zone A of the helmet 100.

By having an area of that shell 101 that is more flexible such as zone A, the striking player's helmet shell 101 can compress more during an impact. This can accomplish several salutary objectives: First, the compression of the striking player's helmet 100 can increase the impact surface area. Increasing the impact surface area can spread the force over a broader surface area. This can reduce peak impact forces.

In contrast, rigid football helmets of the prior art retain more of their spherical shape during an impact. This means when two conventional prior art helmets collide, less surface area of the two prior art helmets comes in contact. This concentrates the impact forces over a limited surface area and increases peak impact forces during a helmet-to-helmet collision.

Second, having a less rigid area such as zone A can lengthen the time of the collision. This can also reduce peak impact forces.

Third, the flexibility of an area such as zone A can discourage the use of the helmet 100 for illegitimate uses such as spearing. By reducing the rigidity of the helmet 100 in those areas commonly used for spearing, the helmet 100 can become a less effective instrument for illegitimate activities such as spearing.

The rigidity of zone B can also be advantageous. Zone B can often be the location on the helmet 100 that receives a blow, since blows that often cause concussions occur at the side of head of the recipient. Pellman et al. (2006). Having increased rigidity at zone B can benefit the safety of the receiving player since the rigidity of zone B can transfer the force of the impact over a greater area of the impacted helmet 100.

In essence the decision about how rigid zone A and zone B should be amounts to a balancing of risks. Having two conventional helmets—both of which are rigid—in a helmet-to-helmet collision increases forces transmitted to the heads of both players. This The issues then become: which helmet 100—the striking helmet 100 or the impacted helmet 100—should be less rigid and at what location? Having the striking helmet 100 be less rigid at the likely area of impact—zone A—can make sense in devising a scheme that maximizes protection of the players. The receiving player is better off being struck by a less rigid object because a less rigid striking helmet 100 transmits less peak force. Conversely, having an impacted helmet 100 with rigidity at the impact location, e.g., zone B, can spread the impact forces over a greater surface area of the receiving player's head. This lessens the peak force transmitted to the receiving player's head.

The receiving player should preferably have this additional level of protection since the receiving player often is in more vulnerable in a collision. For example, as observed by Pellman, the receiving player often cannot line up his torso, neck, and head in the way that the striking player can. Moreover, the receiving player is often unprepared for the collision. Pellman et al. (2006). Both of these factors make the player receiving the blow more vulnerable and thus an appropriate player for increased protection.

Second Embodiment

Figure 2A:
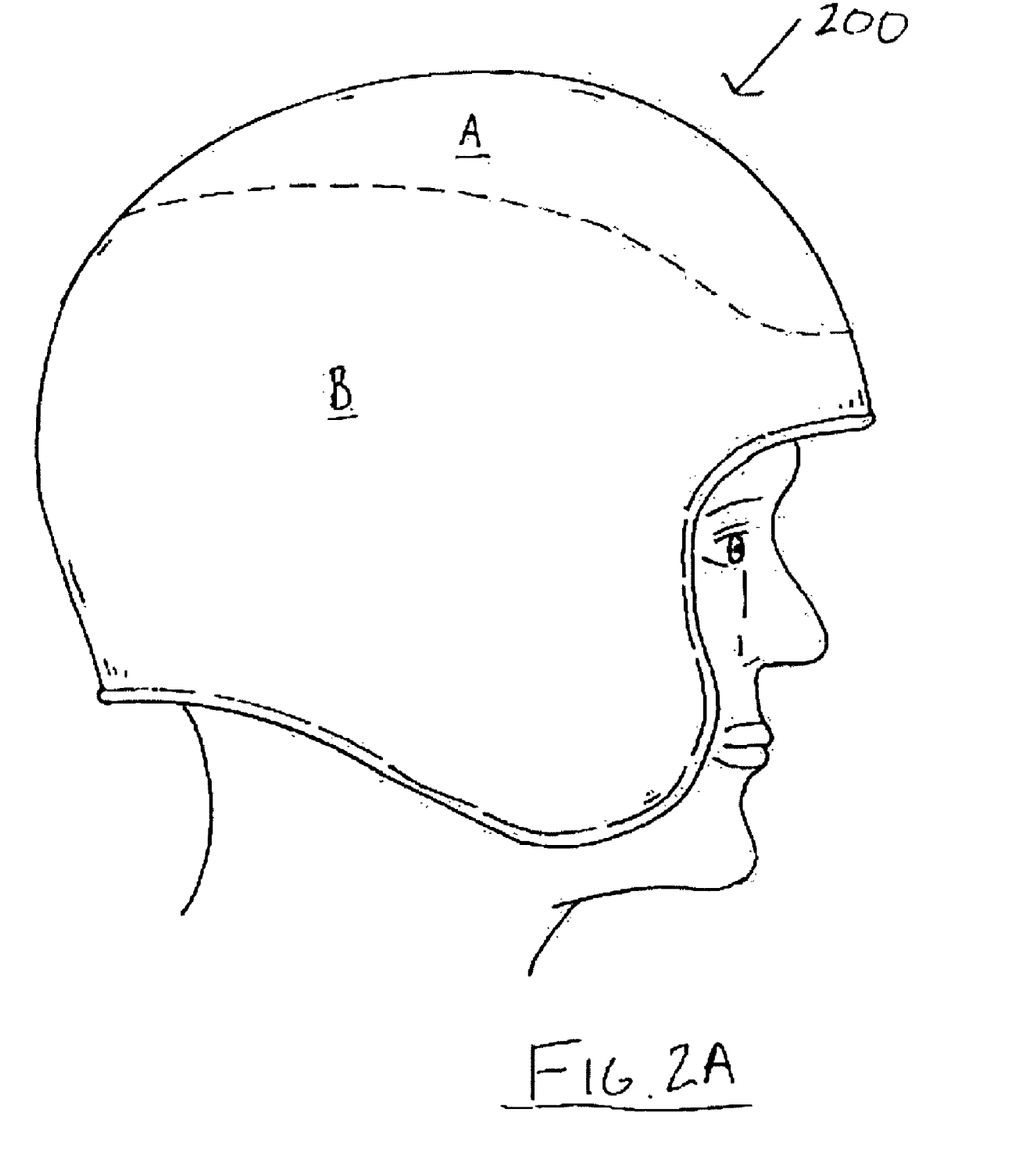
FIG. 2A shows a side elevation view of a head with a helmet according to a second embodiment.

FIGS. 2A and 2B show a helmet 200 according to a second embodiment. The helmet 200 can resemble the helmet 100 according to the first embodiment. The helmet 200 can have some differences.

Like the helmet 100 according to the first embodiment, the helmet 200 according to the second embodiment can have two zones. The first zone, Zone A, can cover an area from below the frontal bone 106 on the front side of the head to the top 107 of the skull 105, bordering, for example, on the parietal bone 108 on either side of the skull 105, to the back of the skull 105, preferably to an area above the occipital bone 109. Zone A on the helmet 200 can cover a larger area of the helmet 200 than Zone A on the helmet 100.

The helmet 200 according to the second embodiment can have at least one potential advantage. Having zone A on helmet 200 be larger than zone A of helmet 100 can make it more likely that the impact location on the striking helmet in a helmet-to-helmet collision will be in zone A.

Third Embodiment

Figure 3A:
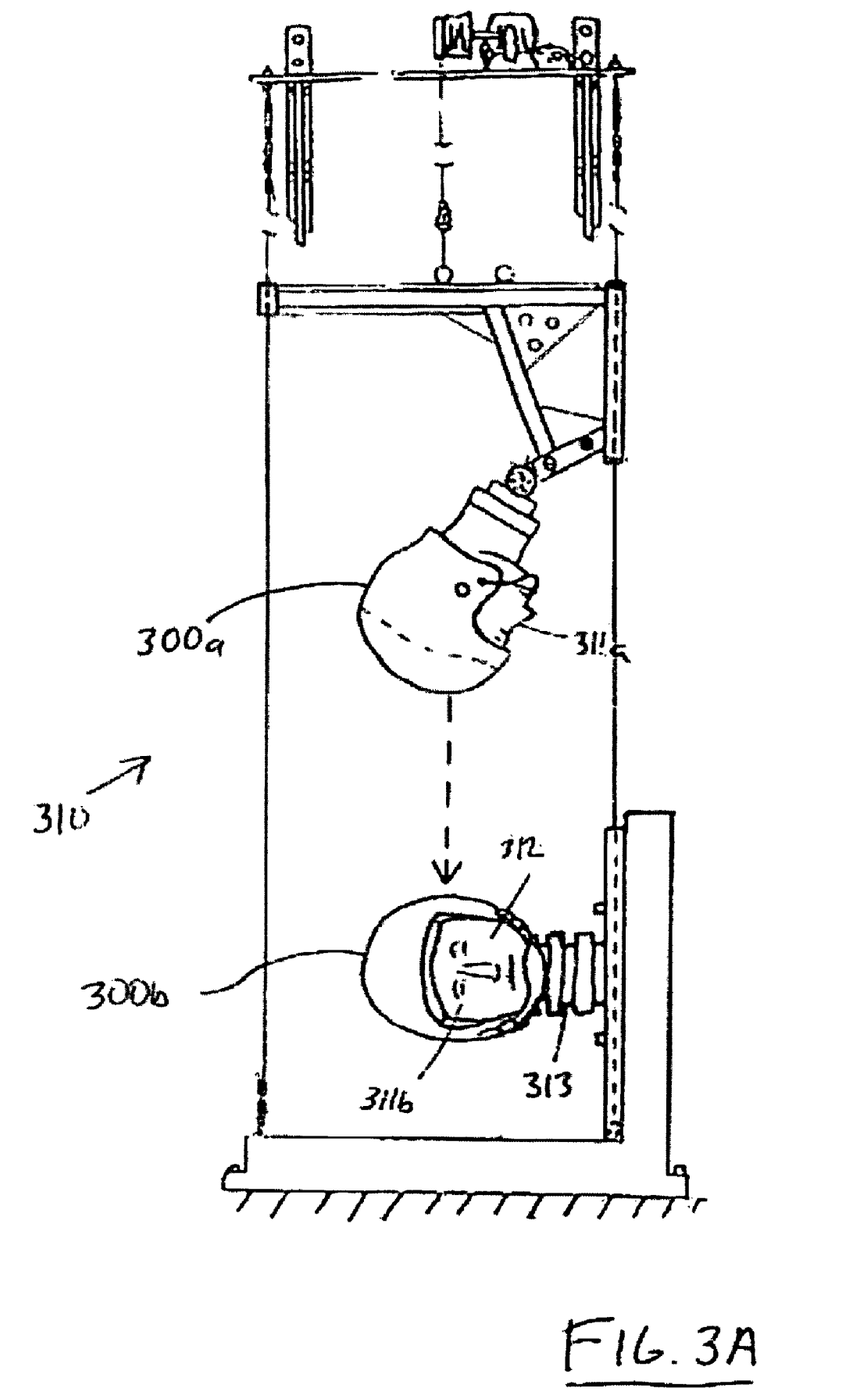
FIG. 3A shows a front view of a testing apparatus with a striking head form with a helmet and an impacted head form with a helmet according to a third embodiment.
Figure 3B:
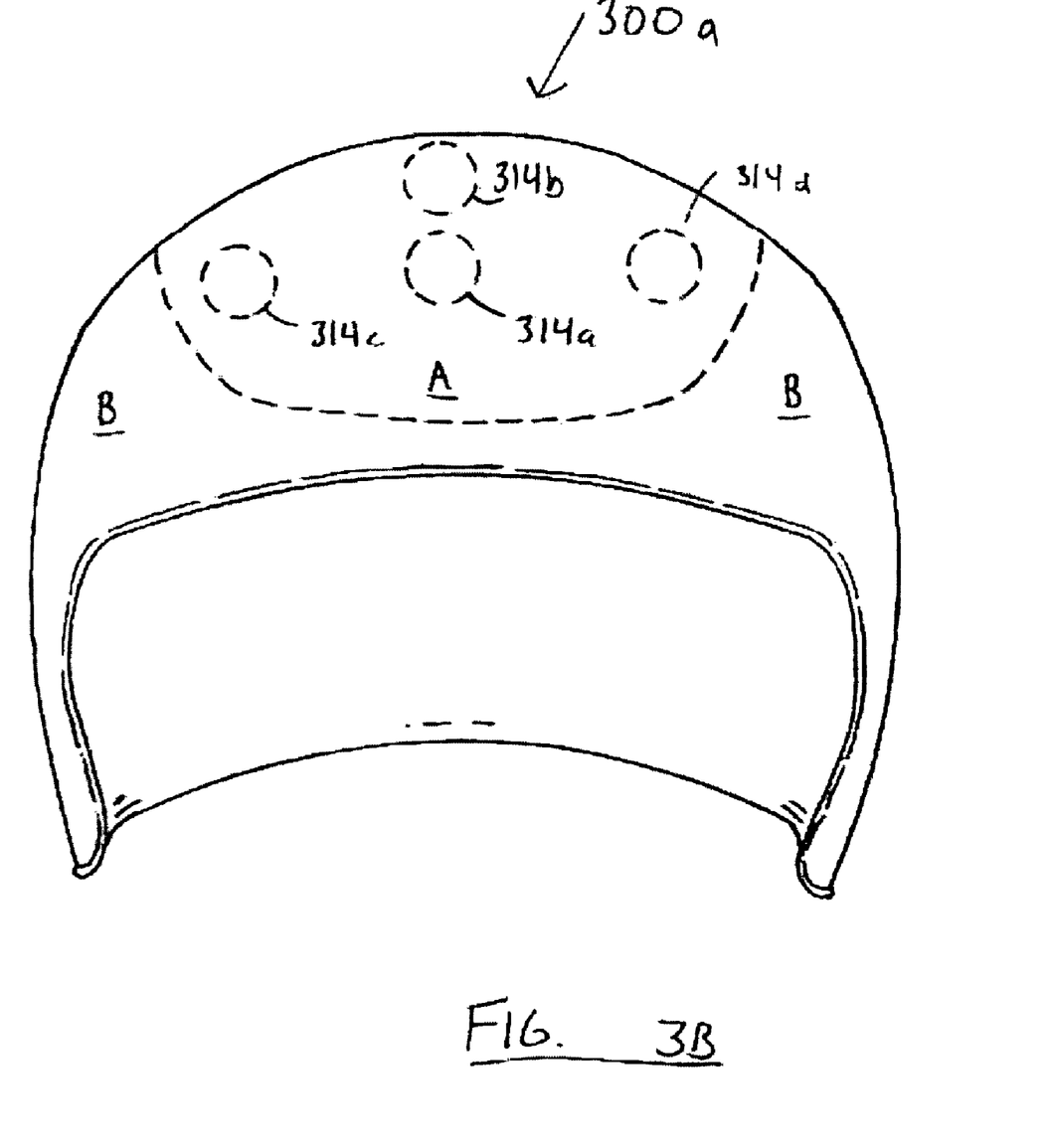
FIG. 3B shows potential impact locations on a striking helmet in a testing method according to a third embodiment.

FIGS. 3A and 3B show an apparatus 310 and method for testing a striking helmet 300a according to a third embodiment. The striking helmet 300a used in the testing can resemble the helmet 100 according to the first embodiment or the helmet 200 according to the second embodiment. Any other helmet (not shown) can also be tested using the apparatus and method.

The testing apparatus 310 and method can serve to replicate blows of a kind delivered in helmet-to-helmet football collisions. The apparatus 310 can, in some respects, resemble apparatuses used in the prior art to test football helmets. For example, the apparatus 310 can be similar to the drop test apparatus used in testing helmets according to the NOCSAE standard. See NOCSAE, Standard Drop Test Method and Equipment Used in Evaluating the Performance Characteristics of Protective Headgear, NOCSAE DOC (ND) 001-06m06 (Revised—January, 2006). The apparatus 310 can be similar to the pendulum apparatus specified in U.S. Pat. No. 6,871,525 to Withnall et al. The patent to Withnall describes an apparatus and method is for testing a helmet's ability to attenuate linear and rotational head acceleration. The apparatus 310 can also be similar to the pneumatic impactor described in Pellman E J, Viano D C, Withnall C, Shewchenko N, Bir C A, Halstead P D, Concussion in professional football: helmet testing to assess impact performance—part 11. Neurosurgery. January 2006; 58 (1):78-96. Many other kinds of apparatuses can also be used.

The testing method and test standard can be used to supplement helmet standards and testing methods that are currently in use, such as the NOCSAE or ASTM standards, or standards that might be issued in the future. Alternatively, the testing method can be used to supplant certain portions of current helmet standards and testing methods.

The apparatus 310 can be capable of developing impacts that approximate those that occur in football games. For example, as mentioned above, a striking player who has lined up his head, neck, and torso may be capable of delivering a blow at 21 mph. The apparatus 310 can be capable of replicating a helmet-to-helmet collision at this velocity.

The helmet 300a being tested can be secured to the striking head form 311a. The striking head form 311a can be instrumented to measure the velocity of the striking head form 311a during a drop test. However, for purposes of measuring the linear or angular acceleration of the impacted head form 311b, the striking head 311a form need not be biofedelic.

The impacted head form 311b can comprise a head and neck assembly (referred to collectively as the "impacted head form"). The head and neck assembly 312, 313 can be of a kind currently in use for collision testing. For example, the impacted head form 311b can be a Hybrid III 50th percentile male anthropomorphic device from First Technology Safety Systems of Plymouth, Mich. Alternatively, the impacted head form 311b can be the Hybrid III 50th percentile ten year old child. Such an impacted head form 311b may be especially useful in testing of helmets that might be used by children who play football.

Many other head forms 311b can be used such as the NOCSAE head form. The NOCSAE head form incorporates a three-dimensional piezoelectric accelerometer (354MO3, PCB Piezotronics, Inc, Depew, N.Y.), mounted at the center of gravity. Many other measurement systems or configurations may be used. For example, if rotational acceleration is also to be measured, a nine accelerometer placement scheme can be utilized. Many other configurations or sensors can be used to measure linear or angular acceleration.

The electronics (not shown) of the testing apparatus 310 can include software, firmware, and hardware. The electronics (not shown) can receive samples (or feedback signals) from the sensor system. The samples from the sensor system can be sent by wire or non-hardwired transmission such as electromagnetic radiation (e.g., radio waves, infra-red, microwave, etc.). The electronics can include a data acquisition device (not shown) that can provide any signal conditioning and A/D conversion required for collecting and measuring the signals from the sensor system. The electronics can include any necessary central processing unit or logic.

FIG. 3A shows one example of an impact test that can be performed according to the testing method. FIG. 3A shows the striking head form 311a in a certain position. For example, the striking helmet 300a in this position can result in an impact at a first impact location 314a on the striking helmet 300a as shown in FIG. 3B. By positioning the striking head form 311a slightly differently, other impact locations 314b, 314c, 314d on the striking helmet 300a, such as second, third, or fourth impact locations 314b, 314c, 314d can be chosen. The testing method can specify which location 314a, 314b, 314c, 314d should be chosen. Impact locations 314b, 314c, 314d can preferably be ones near the frontal bone 106 on the human skull 105. These impact locations 314b, 314c, 314d and ones near it can be preferable because they represent common impact locations for the striking player in impacts that result in concussions for the impacted player. Pellman et al. (2006). However, many other impact locations (not shown) on other parts of the striking helmet 300a can also be used in other embodiments.

FIG. 3A shows the impacted head form 311b in a position that results in a side impact to the impacted head form 311b. A testing protocol for the striking helmet 300a, however, can preferably include other impact locations on the impacted headform 311b. For example, the locations for the impacted head form 311b can be the same as those specified in the NOCSAE Standard Performance Specification for football helmets: side impacts, front impacts, front boss impacts, rear boss impacts, rear impacts, and top impacts. Other impact locations on the impacted helmet 300b other than those specified by NOCSAE could also be used.

The purpose of the test protocol as described can be to test the striking helmet 300a in a replicated helmet-to-helmet collisions between two players. The testing method can measure the amount of energy transmitted by the striking helmet 300a to the impacted headform 311b. This can allow comparisons between different helmets positioned on the striking head form. Under this test, a striking helmet 300a can be considered more protective of the impacted head form when it transmits a lower level of peak energy to the impacted head form 311b.

As noted above, one way in which the transmission of a lower level of peak energy can be achieved is by reducing the modulus of elasticity of a portion a helmet, such as in zone A of helmet 100. However, there may be other ways in which a lowering of the peak energy transmitted by the striking head form can be accomplished. For example, patents in the prior art have discussed cushioning covers for helmets. See, e.g., U.S. Pat. No. 6,446,270 to Durr.

The testing apparatus 310 and method described above can have advantages. First, as observed above, the testing method can measure the amount of energy transmitted by the striking helmet 300a to the impacted head form 311b. Such results can be used to determine which striking helmet 300a delivers the lowest level of peak impact forces. Delivery of lower impact forces by a striking helmet 300a is preferable because it can reduce injury to an impacted player.

Second, the testing method can focus on those impact locations that are likely the ones in helmet-to-helmet collisions in actual football games. For example, an impact location 314a for the striking helmet 300a that is near the frontal bone 106 of the striking player's skull 107 can replicate an impact location common in real-world collisions in football games.

Third, the testing method can focus on the player who is typically most vulnerable to head injury. The player who is struck by another player typically suffers a concussion. The testing method describes a method that can help protect such players.

Fourth, the testing method can be integrated with other testing standards or methods. For example, the testing method described can be integrated with current NOCSAE standards that test the protection provided by the impacted helmet 300b. This can ensure the safety of all players is maximized.

Other Configurations, Uses, or Embodiments

Other embodiments of a helmet (not shown) or testing apparatus and method (not shown) could incorporate other features. Other embodiments could incorporate some or all the features mentioned in relation to the helmet 100 according to the first embodiment or the helmet 200 according to the second embodiment. Those other embodiments could also incorporate features not mentioned above while still being within the scope of the invention.

Helmets according to other embodiments (not shown) could have shells of different configurations. For example, other embodiments could incorporate more or fewer zones of differing amounts of rigidity than described above. A helmet according to other embodiments can be made of materials, be covered with materials, or have materials incorporated in them other than those described above.

Helmets according to other embodiments (not shown) could have liners that are different than the liner described above. Helmets according to other embodiments (not shown) could have accessories such as facemasks, chinstraps, etc., different than those described above.

The testing apparatus and method according to other embodiments (not shown) could be different than those described above. For example, a different apparatus could be used. Different parts of the helmet, both of the striking and impacted helmet, could be tested. The testing apparatus and method could supplement or be incorporated into existing standards or in forthcoming standards.

Modifications

The present invention should not be considered limited to the particular examples described above, but rather should be understood to cover all aspects of the invention as fairly set out in the claims arising from this application. For example, while suitable sizes, materials, fasteners, and the like have been disclosed in the above discussion, it should be appreciated that these are provided by way of example and not of limitation as a number of other sizes, materials, fasteners, and so forth may be used without departing from the invention. Various modifications as well as numerous structures to which the present invention may be applicable will be readily apparent to those of skill in the art to which the present invention is directed upon review of the present specifications. The claims which arise from this application are intended to cover such modifications and structures.

We claim:

1. A method for testing a helmet comprising the steps of: placing a strike helmet on a first headform; placing a target helmet on a second headform, colliding the strike helmet against the target helmet; and measuring the acceleration of the second headform caused by the collision.

2. An apparatus for testing a helmet comprising: a strike helmet placed on a first headform; a target helmet placed on a second headform; a motion device for moving the strike helmet to collide with the target helmet.

3. The apparatus of claim 2 wherein the motion device further comprises a pneumatic impactor.

4. The method of claim 1 wherein the acceleration is linear.

5. The method of claim 1 wherein the acceleration is rotational.

6. The method of claim 4 wherein the acceleration is measured with at least one accelerometer.

7. The method of claim 5 wherein the acceleration is measured with at least one accelerometer.

8. The method of claim 4 wherein the acceleration is measured using video.

9. The method of claim 5 wherein the acceleration is measured using video.

10. The method of claim 1 wherein the strike helmet is of a kind usable in American football.

11. The method of claim 1 wherein the target helmet is of a kind usable in American football.

12. The method of claim 1 including the step of utilizing a neck with the second headform to provide a headform-neck assembly.

13. The method of claim 10 wherein the neck is flexible.

14. The method of claim 1 wherein the position of the strike helmet can be adjusted to collide with different locations on the target helmet.

15. The method of claim 1 wherein the position of the target helmet can be adjusted to allow the strike helmet to collide with different locations on the target helmet.

16. The apparatus of claim 2 wherein the motion device permits a drop of the strike helmet.

17. The apparatus of claim 16 wherein the motion device further comprises a support frame.

* * * * *